US005342587A

United States Patent [19]

Laughlin et al.

[11] Patent Number: 5,342,587

[45] Date of Patent: Aug. 30, 1994

[54] DETERGENT DISPENSER FOR USE WITH SOLID CAST DETERGENT

[75] Inventors: Timothy E. Laughlin, Edina; William H. Scepanski, Bloomington; Kenneth P. Gruber, St. Paul, all of Minn.

[73] Assignee: Sunburst Chemicals, Inc., Minneapolis, Minn.

[21] Appl. No.: 950,932

[22] Filed: Sep. 24, 1992

[51] Int. Cl.[5] .......... B01D 11/02

[52] U.S. Cl. .......... 422/266; 137/268; 138/45; 138/46; 222/181; 222/185; 222/190; 422/261; 422/278; 422/282

[58] Field of Search .......... 222/181, 185, 190; 422/261, 266, 278, 282; 134/93; 137/268, 561 A; 4/229-232; 138/45, 46

[56] References Cited

U.S. PATENT DOCUMENTS

| | | | |
|---|---|---|---|
| 2,704,241 | 3/1955 | Gannon | 134/93 X |
| 3,165,114 | 1/1965 | Garrett | 422/266 X |
| 3,228,040 | 1/1966 | Currie | 422/266 X |
| 3,595,395 | 7/1971 | Lorenzen | 422/282 X |
| 3,615,244 | 10/1971 | Long et al. | 422/261 X |
| 4,250,910 | 2/1981 | King | 137/268 |
| 4,690,305 | 9/1987 | Copeland | 222/52 |
| 4,826,661 | 5/1989 | Copeland | 422/106 |
| 4,858,449 | 9/1989 | Lehn | 68/12 R |
| 4,964,185 | 10/1990 | Lehn | 8/158 |
| 4,995,418 | 2/1991 | Cervola | 137/268 |
| 4,999,124 | 3/1991 | Copeland | 252/90 |
| 5,147,615 | 9/1992 | Bird et al. | 422/261 |

*Primary Examiner*—Robert J. Warden
*Assistant Examiner*—Krisanne M. Thornton
*Attorney, Agent, or Firm*—Patterson & Keough

[57] ABSTRACT

A detergent dispenser that is utilized with solid cast detergent. A single valve is utilized to initiate a flow of a ready to use detergent solution that may be drawn off in container. The valve commences a flow of water that is split in a T-shaped fitting. An appropriate portion is routed to spray on the solid cast detergent and to dissolve the detergent into a concentrated solution. The concentrated solution flows into a conduit where it is mixed with the second portion of the water, diluting the solution to an appropriate concentration for use. A restricter located in the T-shaped fitting acts to split the flow of water appropriately to ensure that the discharge solution is in a ready to use concentration.

8 Claims, 1 Drawing Sheet

DETERGENT DISPENSER FOR USE WITH SOLID CAST DETERGENT

TECHNICAL FIELD

The present invention relates to devices for dispensing a detergent solution. In particular, it relates to a detergent dispenser that is utilized with solid cast detergent and provides a ready to use detergent solution.

BACKGROUND OF THE INVENTION

There is a need in industry today to provide a detergent solution that is ready to use when mixed and that is made from solid cast detergent. Solid cast detergent is essentially detergent that is in solid form and cast in a preferably pliable, plastic container; it is effectively a bar of soap in a plastic container. Removal is typically done by dissolving the detergent in place in the container with a jet of water.

There are a number of advantages to using solid cast detergent as compared to liquid detergent. The first is safety. Since the detergent is cast inside of a container it is virtually impossible for personnel to come in contact with the detergent until it has been diluted. The U.S. Department of Transportation recognizes such detergent as safe to ship. If there is an accident, there is no liquid spillage to contaminate the ground water in the immediate area. The containers, even if cracked by the accident, retain the detergent and may simply be retrieved.

The concentration that is possible with solid cast detergent provides additional advantages. Such detergent is typically 100% detergent material as opposed to liquid detergent which is between 40% and 5% detergent, with the remainder being water. A single capsule of solid detergent can do the same work as six to seven gallons of typical liquid detergent. A related advantage is the compactness of solid detergents that provides benefits when storing the detergent, shipping detergent, and when handling the detergent. The dramatic reduction in storage space is especially attractive to relatively small commercial establishments such as gas stations and fast food restaurants that have very little space to devote to storing cleaning supplies. Freight costs are also dramatically reduced since the cost of shipping water is eliminated. Other handling costs are also reduced since, for equal cleaning potential, substantially less weight and volume is being handled as compared to liquid detergent.

Another advantage of solid cast detergent is that it has an essentially indefinite shelf life. Very little can occur that can change the character of the product over time.

Solid cast detergents are more environmentally sound than liquid detergents. ing of liquid detergent actually have approximately four to five ounces of detergent left when the package is considered empty and therefore is discarded. Raw detergent is accordingly dumped into landfills when liquid detergent packages are discarded. Solid cast detergents use approximately one sixth the volume of empty containers as a liquid system of equal cleaning capacity, and solid cast detergent containers are usually thoroughly rinsed of all detergent by water jet action before being discarded or recycled.

A further requirement of detergent dispensers is that the dispenser should preferably provide a ready to use solution. This requirement is a major concern for many commercial establishments. The portion of the labor pool that is utilized for cleaning functions is typically the lower skilled and less educated portion. Training of these employees is difficult and expensive. The fact that the solution is ready to use minimizes the training that is required for proper usage.

Another aspect of the training issue is that the dispenser should have a minimum number of controls and control operations necessary to obtain a bucket of properly mixed detergent solution. Ideally, the turning of a single valve would provide the solution.

Reliability is another desirable characteristic of a detergent dispenser. A minimum number of moving parts should be provided to minimize maintenance. The dispenser should also be small and be capable of being mounted on the wall, since the storage area for cleaning equipment in most commercial establishments is very small.

In the past, liquid detergent dispensers have been available that dispense a ready to use detergent solution. Additionally, solid cast detergent dispensers have been available. Conventional solid cast detergent dispensers, however, dispense concentrated solutions that must then be properly diluted by maintenance personnel.

In view of the foregoing, it would be a decided advantage to have a detergent dispenser that utilizes a solid cast detergent and that can discharge a ready to use concentration of detergent solution.

SUMMARY OF THE INVENTION

The solid cast detergent dispenser in accordance with the present invention meets the above needs. The detergent dispenser hereof is a reliable, easy to use mechanical device capable of being mounted on a wall in a very limited space that dispenses a ready to use detergent solution from a solid cast detergent.

The disclosed detergent dispenser is adapted for connection to a source of water, such as a conventional sink. The dispenser includes a dispenser bowl adapted to receive the solid cast detergent and includes a water jet disposed in the dispenser bowl to direct a spray of water onto the detergent block. The spray dissolves the detergent to produce a concentrated solution of detergent and water.

The dispenser has a conduit connecting the dispenser to the water source. The conduit includes a fitting that distributes the water once it is received within the dispenser. This fitting has an inlet for connection to the water source and two outlets. A second conduit is connected at one end to a first one of the outlets from the fitting, and is connected at its opposed end to the water jet in the dispenser bowl. The second conduit provides a water spray from the water jet to produce the concentrated detergent solution. A third conduit is connected to the dispenser bowl for conveying the concentrated solution from the dispenser bowl. A fourth conduit is connected to the second outlet of the fitting and conveys water from the fitting to a point where the conduit intercepts the third conduit. At this point, the water mixes with the concentrated detergent solution in the third conduit forming a properly diluted detergent solution. The properly diluted detergent solution then flows out the discharge end of the third conduit.

A restricter is disposed in the fitting means for selectively parting the water entering the fitting and directing a first portion of the water to the first outlet and the remaining portion of the water to the second outlet in a desired ratio to obtain the properly diluted detergent solution.

DETAILED DESCRIPTION OF THE DRAWINGS

Figure 1:
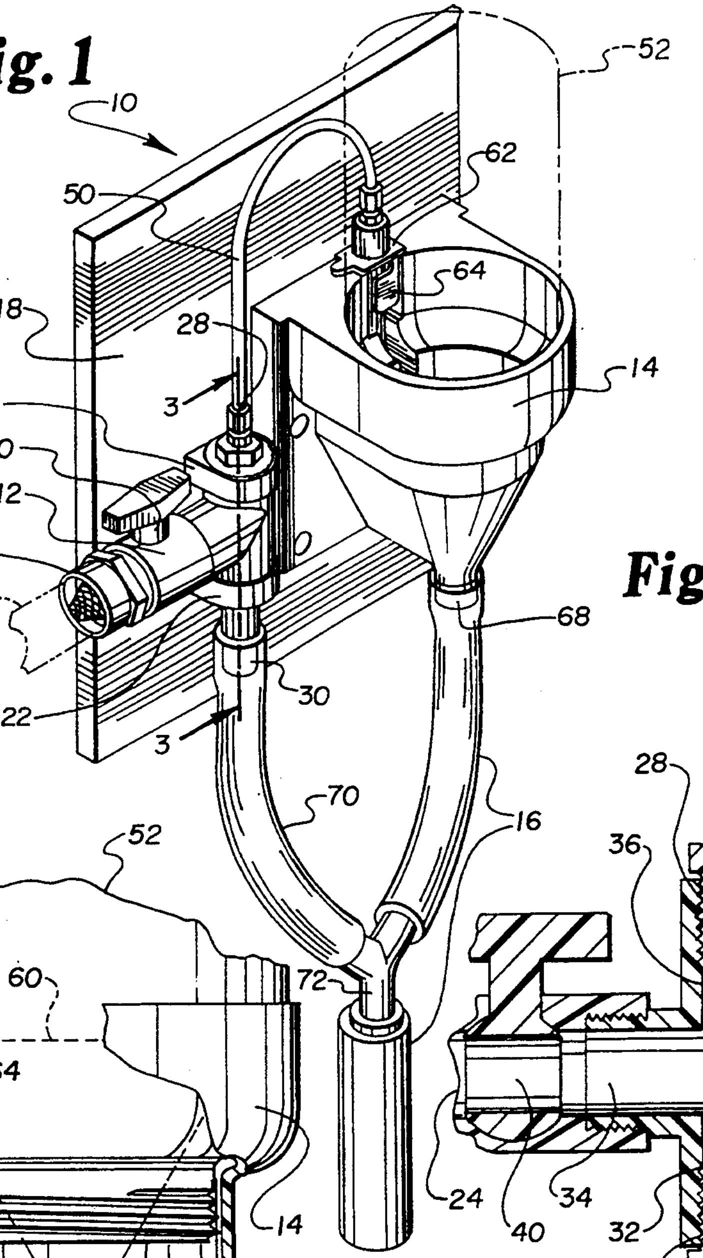
FIG. 1 is a partially schematic, perspective view of a detergent dispenser in accordance with the present invention.

Referring to the drawings, a detergent dispenser 10 in accordance with the present invention broadly includes fitting 12, dispenser bowl 14, and mixing conduit 16. The fitting 12, dispensing bowl 14, and mixing conduit 16 are mounted onto a backing board 18.

Fitting 12 comprises a generally T-shaped fitting. In the preferred embodiment, fitting 12 is constructed of commercially available plastic plumbing material that is cast as desired. The plastic utilized in the construction can be any synthetic resin capable of withstanding the temperatures that are generally found in water that is available at the hot water systems in commercial establishments. Fitting 12 is mounted by clamps 20, 22 to backing board 18. Clamps 20, 22 have interlocking teeth and may be sufficiently tightened by hand pressure in order to facilitate the rapid assembly of dispenser 10.

Fitting 12 has a single inlet, designated at 24. Inlet 24 is connected by conduit 26 (shown in phantom in FIG. 1) to the hot water supply (not shown) of the building in which the detergent dispenser 10 is installed. The inlet of conduit 26 is typically connected to the water spigot of a sink. In the preferred embodiment, a conventional compression fitting (not shown) connects conduit 26 to fitting 12. By tightening nut 28, a slip ring (not shown) that is around conduit 26 is forced against a seat (not shown) within inlet 24. This force tightens the ring around conduit 26, thereby holding conduit 26 in place and creating a water tight seal between inlet 24 and conduit 26.

Fitting 12 includes first and second outlets 28, 30. Interior passageway 32 fluidly connects inlet 24, outlet 28, and outlet 30. Interior passageway 32 is T-shaped, having a first branch 34 in communication with inlet 24, a second branch 36 in communication with outlet 28, and a third branch 38 in communication with outlet 30. First branch 34 includes a valve 40 for selectively closing and opening branch 34 for fluid transmission.

Third branch 38 has a fluid flow restricter 42 disposed in it. The restricter 42 comprises an elastomeric O-ring 44 that is compressively held in branch 38. An elongated tube 46 is compressively held in the central hole in O-ring 42. Orifice 48 passes longitudinally through tube 46. It will be appreciated that an alternative restricter (not shown) may employed in second branch 36 for use in conjunction with restricter 42, or in place of restricter 42.

First outlet 28 is connected to a first end of conduit 50. Connection is preferably by a compression fitting as described above for conduit 26. Conduit 50 is of relatively small diameter tubing in comparison to conduit 26. Conduit 50 is preferably made of pliable plastic tubing.

Dispenser bowl 14 is known in the industry and is typically constructed of a synthetic resin material. Dispenser bowl 14 is adapted to receive inverted detergent container 52, shown in phantom in FIG. 1. Detergent container 52 contains a block of solid cast detergent, and the container 52 is inserted into dispenser bowl 14 with the lid of detergent container 52 removed to expose the detergent block. When in place, detergent container 52 is held with mouth 54 positioned above water jet 56.

Water jet 56 is fluidly connected to fitting 12 by conduit 50. Water jet 56 is designed to emit a spray pattern of water 58 that will impinge upon the solid cast detergent 60 in detergent container 52.

Figure 2:
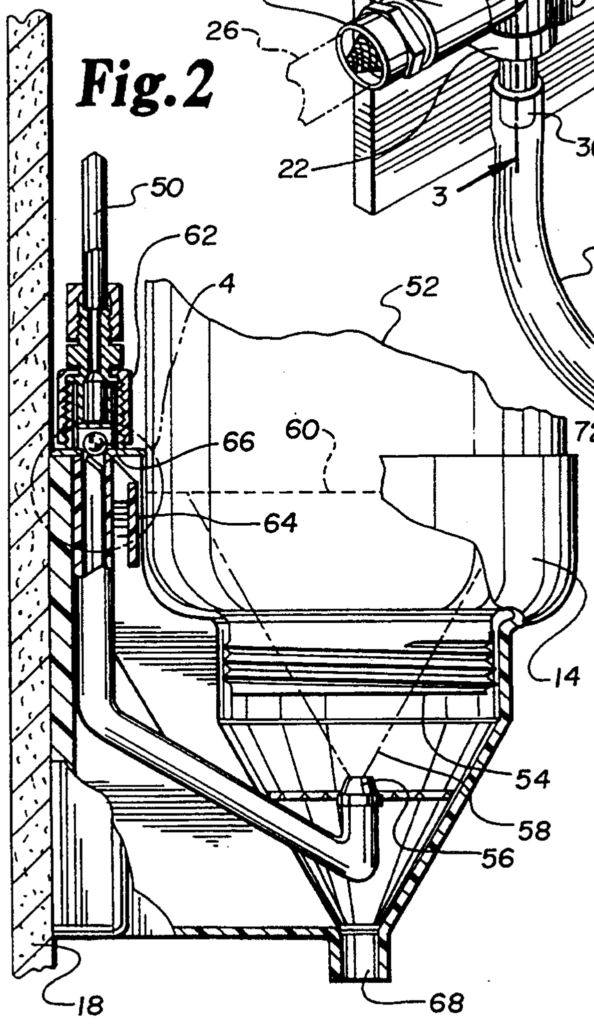
FIG. 2 is a sectional view of the detergent dispenser bowl taken along line 22 in FIG. 1.
Figure 3:
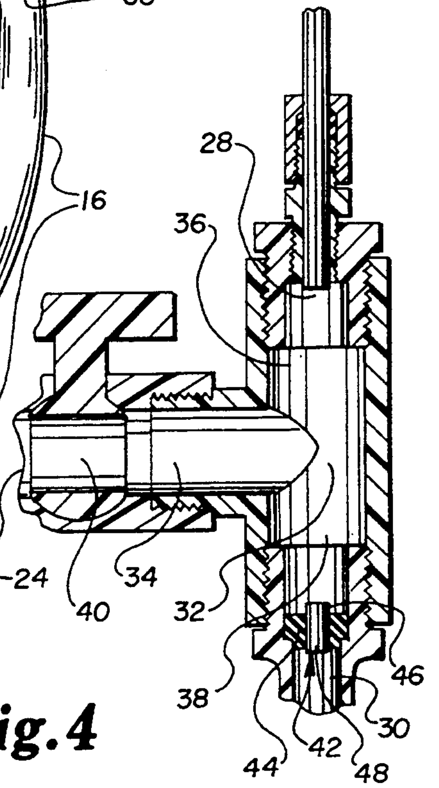
FIG. 3 is a sectional view of the T fitting and valve assembly taken along line 3—3 in FIG. 1.
Figure 4:
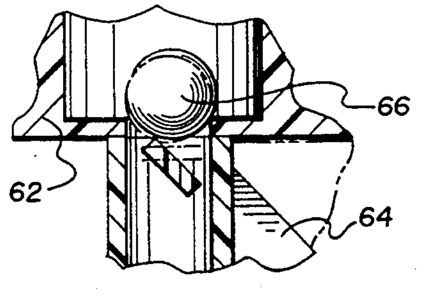
FIG. 4 is an enlarged sectional view of the ball stop in the control housing of the detergent dispenser bowl as shown in the circle labeled 4 in FIG. 2.

Control housing 62 is included in detergent dispenser bowl 14 to selectively control the flow of water to water jet 56. Control is dependent upon the presence of a detergent container 52 within detergent dispenser bowl 14. When a detergent container 52 is in place as shown, paddle switch 64 is in its depressed, open position. In this position, ball stop 66 is in its raised position to admit water to water jet 56. When no detergent container 52 is within detergent dispenser bowl 14, paddle switch 64 swings open and ball stop 66 drops to the position shown in FIGS. 2 and 4, thus sealing off the water from water jet 56.

Dispenser bowl 14 has a gravity drain 68 located in its lowermost portion. Gravity drain 68 is connected to a first end of mixing conduit 16. The second end of mixing conduit 16 is a discharge port for discharging the properly mixed detergent solution. Mixing conduit 16 is preferably of sufficient length such that its discharge end will be comfortably retained in a detergent solution container, such as a bucket, when the container is placed on the floor beneath the detergent dispenser 10.

Conduit 16 is intercepted by a first end of conduit 70. In the embodiment shown, the interception is effected by use of Y-fitting 72. The second end of conduit 70 is connected to the second outlet 30 of fitting 12, thereby fluidly connecting fitting 12 to conduit 16.

In operation, detergent dispenser 10, mounted on backing board 18, is mounted to a wall, usually approximately four feet above the floor with fasteners (not shown) at the four corners of backing board 18.

Conduit 26 is left connected to the water system so that water is continually available at inlet 24. When it is desired to draw a container of detergent solution, the operator need only place a bucket beneath mixing conduit 16 to accept the detergent solution and open the single control valve 40 on the detergent dispenser 10.

Opening valve 40 admits water to interior passageway 32 of fitting 12. The water, under pressure from the tap, floods interior passageway 32. A portion of the water flows to branch 36 and the remaining portion of the water flows to branch 38 of interior passageway 32.

The ratio of water flowing to branches 36, 38 respectively is important to the proper operation of the detergent dispenser 10. This ratio will be better understood after reviewing the full operation of the detergent dispenser 10. At this point it is important to understand that the ratio is effectively controlled by the size of the orifice 48 in restricter 42.

The first portion of water flowing from fitting 12 flows through outlet 28 and into conduit 50. Conduit 50 conveys the water to control housing 62. When paddle switch 64 is depressed by the presence of a detergent container 52, water is supplied to water jet 56. Water jet 56 generates a spray 58 that impinges on the detergent 60 in detergent container 52, dissolving a portion of the detergent 60. A concentrated solution of detergent and water results and flows from the detergent container 52 to the bottom of dispenser bowl 14 at drain 58. From drain 58 the concentrated detergent solution flows into mixing conduit 16.

The second portion of the water flowing through interior passageway 32 of fitting 12, flows through orifice 48 of restricter 42. This portion of the water passes out of outlet 30 and into conduit 70. At the point of interception of mixing of conduit 16, the water in conduit 70 mixes with the concentrated detergent solution flowing in mixing conduit 16. The water from conduit 70 dilutes the detergent solution, resulting in a solution of correct strength flowing from the discharge port of mixing conduit 16. Such detergent solution is ready as it flows into the bucket for use by the operator. To stop the flow of detergent solution, the operator need only close valve 40 shutting off the water supply to water jet 56.

The amount of solid cast detergent 60 that is dissolved by the spray 58 from water jet 56 is a function of several factors, including the pressure and temperature of the water that makes up the spray 58 from water jet 56, the volume of water that makes up the spray 58, and the hardness of the water. These factors affect the concentration of the solution that flows into mixing conduit 16. The volume of water from conduit 70 that intercepts the concentrated solution flowing in conduit 16 affects the solution strength that flows from mixing conduit 16 into the container. Given that the total volume of water, the pressure of the water, the temperature of the water and the hardness of the water are fixed for a given installation of detergent dispenser 10, the variable that sets the solution concentration parameters of the solution flowing into the container is the size of the orifice 48 in restricter 42.

Orifice 48 determines the ratio of water at the inlet 24 that flows from outlets 28, 30, respectively. It will be appreciated that increasing the flow out of outlet 28 consequently reduces the flow available at outlet 30. Generally, the ratio of total water volume that must be utilized for spray from water jet 56 must be increased to account for the effects of a low total volume of water, low water pressure, low water temperature, and high water hardness. A number of orifice sizes are provided to match the detergent dispenser 10 to the water conditions of the particular installation through the use of alternate restricters 42 having different size orifices. The size of the restricter orifice 48 is typically set by the technician at the time of installation of the detergent dispenser 10 in order to ensure that the proper solution is always available for ready use by the operator.

Although the drawings depict a restricter 42 disposed only in branch 38 of interior passageway 32, it may be desirable in some installations to complement restricter 42 with a second restricter disposed in branch 36 or to employ a restricter only in branch 36 of interior passageway 32.

What is claimed is:

1. A detergent dispenser adapted for receiving water from a source and for delivering a ready to use solution of detergent and water to a container, the detergent dispenser having a dispenser bowl constructed and arranged to receive a cast solid detergent therein and including a water jet disposed in the dispenser bowl to direct a spray of water onto the detergent to dissolve the detergent and thereby produce a concentrated solution of detergent and water, wherein the improvement comprises;

fitting means for distributing the water received from the source within the dispenser, having an inlet and a first and a second outlet, the inlet being operably fluidly coupled to the second end of the water source and wherein the fitting means has a bifurcated passageway defined therein, with a respective branch of the bifurcated passageway fluidly coupled to the inlet, the first outlet and the second outlet thereby connecting the inlet and the first and second outlets in fluid communication;

first conduit means for conveying water from the first fitting means to the water jet, having a first conduit means first end operably coupled to the first outlet of the fitting means and first conduit means second end operably coupled to the water jet thereby providing said water spray from said water jet to produce said concentrated solution;

second conduit means for conveying said concentrated solution from the dispenser bowl, the second conduit means having a second conduit means first end operably coupled to the dispenser bowl and a second conduit means discharge end;

third conduit means for conveying water from the fitting means to the second conduit means, having a third conduit means first end operably coupled to the second outlet of the fitting means and conveying water therefrom and a third conduit means second end intercepting and in fluid communication with the second conduit means, the water mixing with and diluting the concentrated solution in the third conduit means;

the third conduit means second end providing a discharge port for the diluted detergent solution; and preset restricter means operably fluidly disposed in the fitting means for selectively parting the water entering said fitting means inlet and directing a portion of the water to said first outlet and diverting the remaining portion of the water to said second outlet in a desired ratio.

2. The detergent dispenser as claimed in claim 1 wherein the restricter means comprises an elastomeric ring defining a central hole therethrough and an elongated tube radially compressively held in the hole, the tube having an elongated central orifice therethrough defining an area selected to achieve a desired rate of water flow therethrough, the elastomeric ring compressively disposed in the second outlet branch of the bifurcated passageway.

3. The detergent dispenser as claimed in claim 2 wherein the restricter means further comprises a second elastomeric ring defining a central hole therethrough and a second elongated tube radially compressively held in the hole, the second tube having an elongated central orifice therethrough defining an area selected to achieve a desired rate of water flow therethrough, the second elastomeric ring compressively disposed in the first outlet branch of the bifurcated passageway.

4. The detergent dispenser as claimed in claim 1 wherein the restricter means comprises an orifice defining an area selected to achieve a desired rate of water flow therethrough operably fluidly disposed within the second outlet branch of the bifurcated passageway.

5. The detergent dispenser as claimed in claim 4 wherein the restricter means further comprises a second orifice defining an area selected to achieve a desired rate of water flow therethrough operably fluidly disposed within the first outlet branch of the bifurcated passageway.

6. The detergent dispenser as claimed in claim 1 wherein a valve is operably coupled to the inlet branch of the bifurcated passageway to selectively admit water to the detergent dispenser.

7. A detergent dispenser adapted for receiving water from a source and for delivering a ready to use solution of detergent and water to a container, the detergent dispenser having a dispenser bowl constructed and arranged to receive a cast solid detergent therein and including a water jet disposed in the dispenser bowl to direct a spray of water onto the detergent to dissolve the detergent and thereby produce a concentrated solution of detergent and water and a conduit connecting the dispenser bowl to the container and conveying the concentrated solution to the container, wherein the improvement comprises;

bifurcation means for parting the water received from the source into two portions, the first portion being directed to the water jet and producing the concentrated solution, the second portion being directed to the conduit to mix with the concentrated solution and to dilute said solution to an appropriate concentration for use, wherein the bifurcation means includes preset ratio fixing means for selectively fixing the ratio of water that is supplied to the two portions.

8. A detergent dispenser as claimed in claim 7, wherein the preset ratio fixing means is an orifice through which one of the two portions of the water must flow.

* * * * *